United States Patent [19]

Bryant

[11] 4,208,822

[45] Jun. 24, 1980

[54] FISH LURE

[76] Inventor: Charles H. Bryant, 3 Sutton St., Uxbridge, Mass. 01569

[21] Appl. No.: 797,322

[22] Filed: May 16, 1977

Related U.S. Application Data

[62] Division of Ser. No. 688,043, May 19, 1976, abandoned.

[51] Int. Cl.² ............................................. A01K 85/01
[52] U.S. Cl. ................................. 43/42.02; 43/42.24; 43/42.31
[58] Field of Search ............... 43/42.02, 42.06, 42.2, 43/42.21, 42.22, 42.24, 42.25, 42.26, 42.28, 42.3, 42.31, 42.39

[56] References Cited

U.S. PATENT DOCUMENTS

| | | | |
|---|---|---|---|
| 941,911 | 11/1909 | Burthe | 43/42.02 |
| 2,563,386 | 8/1951 | Wight | 43/42.22 |
| 2,690,026 | 9/1954 | King | 43/42.02 |
| 2,722,766 | 11/1955 | Accetta | 43/42.24 |
| 2,765,572 | 10/1956 | Woolfe | 43/42.06 |
| 2,787,076 | 4/1957 | Kring | 43/42.22 X |
| 2,910,799 | 11/1959 | Wentworth | 43/42.02 |
| 2,912,784 | 11/1959 | Carlin | 43/42.24 X |
| 3,376,663 | 4/1968 | Amrine | 43/42.02 |
| 3,938,275 | 2/1976 | Fukushima | 43/42.24 |

*Primary Examiner*—Nicholas P. Godici
*Attorney, Agent, or Firm*—Wolf, Greenfield & Sacks

[57] ABSTRACT

A fishing lure having a flexible, resilient intermediate body portion which, upon imparting a sudden jerk to the line, will cause the intermediate portion to collapse in a manner which simulates the movement of a squid through the water. The collapsing intermediate portion of the lure also generates an audible sound which is much like the sound made by a squid.

12 Claims, 6 Drawing Figures

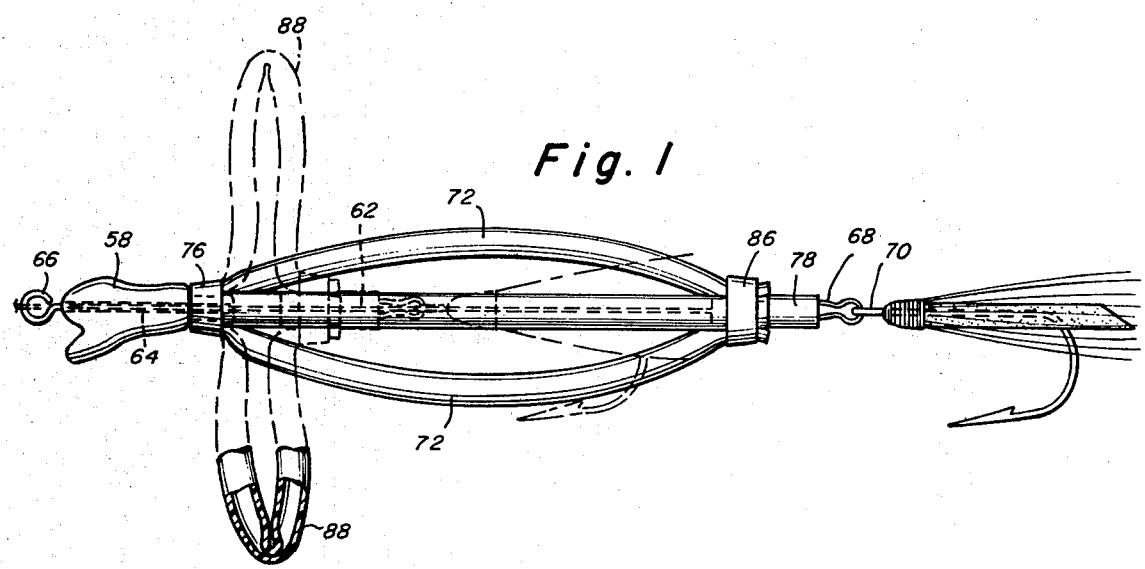
Fig. 1
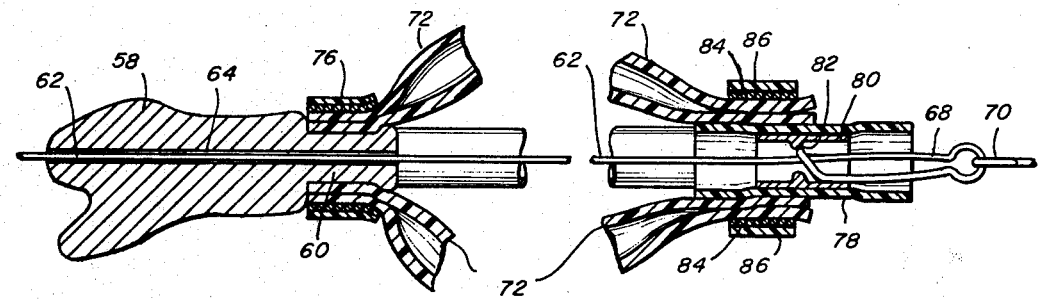
Fig. 2
Fig. 3
Fig. 4
Fig. 5
Fig. 6

FISH LURE

BACKGROUND AND SUMMARY OF THE INVENTION

This application is a division of copending U.S. application Ser. No. 688,043 filed May 19, 1976 now abandoned.

This invention relates to improvements in fishing lures and in particular, to fishing lures having improved means for attracting fish by various combinations of sight, sound and dynamic action to simulate live bait action.

The lure includes a relatively massive head and a trailing intermediate portion attached to the head. The head and intermediate portion are slidably mounted on a longitudinally extending wire. The intermediate portion is resilient and flexible and can be collapsed along its length to enable the trailing, hook end of the lure to be drawn toward the head. The trailing end of the wire is connected to the rear end of the intermediate portion and hook. The line is attached to an eye at the forwardly extending end of the wire which protrudes through the lure head. When the line is jerked, the mass of the head tends to resist forward motion which causes the trailing end of the lure to be drawn forwardly toward the head causing the intermediate portion to collapse. The intermediate collapsible portions of the lure preferably are from rubber tubing which, when collapsed, will kink and make an audible sound not unlike that of a squid. The action of this lure simulates the movement of that of a squid in that the tail end of the lure is first drawn toward the head and then the head advances forwardly.

In a further aspect of the invention, the weighted head is mounted on the wire with its center of gravity displaced from the axis of the wire to cause the head to assume an upright and stable attitude. In this embodiment, the head includes a pair of transversely extending vanes which are disposed at a selected angle to cause the lure to dive, skim or advance forwardly as the lure is drawn through the water.

It is among the primary objects of the invention to provide fishing lures which will attract fish by various combinations of sight, sound and dynamic action.

Another object of the invention is to provide a fishing lure which displays optical effects to attract fish more effectively.

A further object of the invention is to provide a fishing lure having dynamic actions which simulate live bait.

Another object of the invention is to provide a fishing lure which generates an audible sound similar to sounds generated by live bait.

Another object of the invention is to provide a fishing lure which, when jerked, will simulate the action of a squid.

DESCRIPTION OF THE DRAWING

The foregoing and other objects and advantages of the invention will be understood more fully from the following further description thereof wherein:

FIG. 1 is a side elevation of the lure illustrating its collapsible midportion and the manner is which it simulates the action of a squid advancing through the water;

FIG. 2 is a sectional and partly broken away illustration of the lure shown in FIG. 1;

FIG. 3 is a plan view of a modified embodiment of the weighted lure head;

FIG. 4 is a side elevation of the lure head shown in FIG. 3 illustrating transversely extending vanes at an attitude which will guide the lure in a straight direction;

FIG. 5 is a side elevation of the type of lure head shown in FIG. 3 but with the vanes disposed at an angle which will cause the lure to drive when it is pulled through the water; and FIG. 6 is a side elevation similar to FIGS. 4 and 5 illustrating the transversely extending vanes in an attitude to cause the lure to tend to skim along the water.

DETAILED DESCRIPTION OF THE INVENTION

FIGS. 1 and 2 show the lure which operates dynamically in response to a sharp jerk on the fishing line to effect an action comparable to that of a squid. This lure includes a weighted, relatively massive head 58 having a reduced neck portion 60. A wire 62 passes through a bore 64 in the head and an eye 66 is formed at the forwardly protruding end of the wire 62 for attachment to the fishing line. The wire 62 extends rearwardly from the head and terminates in a wire latch arrangement 68 to which may be attached the fishing hook 70. The head 58, which is slideable along and with respect to the wire 62 has one or more resilient deformable elements 72 attached to the neck portion 60 which extends rearwardly from the neck and defines an intermediate lure portion. In the embodiment shown, which has four elements 72, the deformable elements 72 comprise flexible and resilient rubber or plastic tubes. They are secured to the neck 60 of the head 58 by tightly wound threads 74 which may be covered by a rubber or plastic, elastic sleeve 76. The rearward ends of the tubes 72 are brought together and are attached to a rubber or plastic sleeve 78 which has a metal bushing 80 therein. The trailing end of the wire 62 passes through the opening in the bushing 80 and the bushing is constructed to present an obstruction 82 to the wire latch 68 to preclude the latch 68 from being drawn forwardly through the bushing 80. If desired, the bushing 80 may be secured to the wire 62. The trailing ends of the tubes 72 may be bound securely to the sleeve 78 by wire threads 84 which, in turn, may be wrapped about with an elastic band 86.

In operation, the lure simulates the movement of a squid and also generates audible sounds not unlike those made by a squid. The inherent resilience of the tubes 72 causes the lure to assume the configuration shown in solid in FIG. 1 in which the head 58 and hook end of the lure are separated. The lure is operated by jerking on the fishing line. Because of the relatively large mass and inertia inherent in the heavy head 58, a sharp jerk on the line will draw the wire 62 forwardly which will cause the resilient deformable tubes 72 to collapse or contract longitudinally as their trailing ends are drawn sharply toward the head end of the lure. When drawn fully forward, the tubes will assume a configuration as suggested in phantom in FIG. 1. As the tubes 72 collapse in the manner described, they also expand laterally and in doing so, simulate the laterally expansive and longitudinally contractive motions of a squid in movement. Moreover, as the tubes 72 deform toward the position shown in phantom in FIG. 1, this imparts a bias to the head 58 tending to urge the head 58 forwardly.

Because of the relatively large mass of the head 58, it accelerates forwardly at a far slower rate than the trailing portions of the tubes 72. The action thus is one in which the tubes 72 first contract to their laterally expanded configuration followed by subsequent forward movement of the head along the wire 62 under influence of the resilience of the longitudinally contracted intermediate portion. In addition to simulating the motion of a squid, the lure shown in FIGS. 1 and 2 also generates an audible sound which is somewhat similar to the sound made by a squid. As the tubes 72 collapse, the tube walls in the region of the bight portions 88 reach a degree of bending in which the walls become kinked as shown in FIG. 1. The transition from the tubular cross section to the kinked cross section is a snapping type of action which generates an audible sound both when the tubes move to the contracted configuration shown in FIG. 1 as well as when they return to their original configuration shown in solid in FIG. 1 as the head 58 advances forwardly along the wire 62. The sound is generated by each of the tubes as their bight portions snap from the circular to the kinked position and then from the kinked position back to the circular cross sectional configuration. The loudness of the sounds is a function of the relative cross-sectional dimensions of the tubes as well as the number of tubes used, and I have found four tubes to be preferable both as to audible quality as well as in appearance. If desired, the tubes 72 may extend rearwardly beyond the binding sleeve 78 and may be cut away to define bifurcations which further simulate the appearance of a squid. It should also be noted that the elongate and resilient characteristics of the tubes 72 also result in the tubes vibrating for a short time after the lure is returned to its relaxed configuration shown in FIG. 1 in solid. As the weighted head 58 advances forwardly along the wire 62, it stops, rather abruptly at its most forward position as the tubes 72 are still advancing inwardly. This sets up a series of transversely oscillations of the tubes 72 with vibrations which pass through the water and may be sensed by the fish.

FIGS. 3-6 illustrate further modifications which may be made to the weighted head to control the action of the lure particularly with respect to the depth at which the lure advances through the water and the action of the lure when the fishing line is pulled sharply. FIGS. 3 and 4 show a weighted head 90 to which the trailing portions, indicated generally by the reference character 92 are attached. The head 90 has a hole 94 through which passes the longitudinally extending wire 96 by which the lure is attached to the fishing line. The lure head 90 is made from a relatively heavy material and is formed, with respect to the longitudinal axis of the wire 96 and wire-receptive hole 94 so that the center of gravity of the head 90 will be displaced from the axis of the wire 94 to maintain the lure head 90 in the approximate "upright" attitude shown. Because of the displaced center of gravity of the head 90, the lure will advance through the water in a relatively stable attitude and will not rotate significantly or spin about the axis of the wire. The lure head 90 also includes a pair of transversely extending fins 98 protruding from each of its sides. The fins 98 preferably are attached to the lure head 90 at a location below the longitudinal axis of the wire 96 and hole 94 to contribute to the displaced center of gravity of the head 90 and to aid in stabilizing the head 90.

Depending on the type of action desired with the particular lure, the fins 98 may be oriented at varying angles of incidence with respect to the lure head and the axis of the wire 96 and hole 94. For example, when it is desired that the lure advance through the water along a generally straight line and at a relatively constant depth, the fins 98 may be oriented on the head at a neutral angle of incidence as suggested in FIG. 4 which will not display any significant tendency for the lure to dive or skim as the lure is advanced through the water. As shown in FIG. 4, the chord of the fins 98 extends approximately parallel to the longitudinal dimension of the lure head 90.

FIG. 5 shows the lure head in which the fins 98' are oriented at a negative angle of incidence which will cause the lure to tend to dive as it advances through the water. The depth to which the lure will dive will depend on the length of fishing line which has been let out. In addition, if the line is jerked sharply, that will tend to cause the lure shown in FIG. 5 to dive at a somewhat sharper rate.

FIG. 6 shows a lure head in which the fins 98" are oriented at a positive angle of incidence which will tend to cause the lure to skim along the surface of the water when the lure is drawn through the water. If desired, the embodiment shown in FIG. 6 may be drawn through the water at a relatively low speed or, simply permitted to sink without being drawn through the water and then a sharp tug may be applied to the fishing line which will cause the lure to advance upwardly through the water at a rate and angle dependent on the sharpness at which the fishing line is pulled The modified lure heads shown in FIGS. 3-6 provide a degree of control to the fisherman and the resulting combination of various simulated action provide a high degree of enticement to the fish. Also, it may be noted that the advancing force applied to the head is applied from the rear of the head, through the trailing portions of the lure. This tends to amplify the sharpness of the diving or surfacing action of the lures using heads as shown in FIGS. 5 and 6, respectively.

It should be understood that the foregoing descriptions of the lures are intended merely to be illustrative thereof and that other embodiments and modifications may be apparent to those skilled in the art without departing from the spirit of the invention.

Having thus described the invention, what I desire to claim and secure by Letters Patent is:

1. A fishing lure comprising:
   an elongate wire having means for attachment to a fishing line at its forward end and means for attaching a fishing hook to its rearward end;
   a relatively heavy, massive head slideably mounted on the wire for movement longitudinally along the wire, said head being normally disposed at the forward end of the wire;
   at least one resilient, flexible and deformable intermediate member attached to the head for movement therewith, the member extending rearwardly therefrom and being mounted at its rearward end to said wire;
   said head being of sufficient mass so that upon imparting a sharp pull to the forward end of the wire, the trailing end of the wire and the trailing end of the intermediate member will be drawn forwardly toward the head;
   said member being collapsible longitudinally of the lure as the trailing end of the member is drawn toward the head;
   said member being constructed and arranged to resiliently urge the head toward its normal disposition forwardly along the wire after said member has been resiliently collapsed;

means responsive to collapsing of said member to generate an audible sound.

2. A fishing lure as defined in claim 1 further comprising:

said head having a hole formed therethrough, the wire extending through said hole.

3. A fishing lure as defined in claim 1 wherein said intermediate member comprises a hollow, elongate tubular member.

4. A fishing lure comprising:

an elongate wire having means for attachment to a fishing line at its forward end and means for attaching a fishing hook to its rearward end;

a relatively heavy, massive head slideably mounted along the wire, said head being normally disposed at the forward end of the wire;

at least one resilient, flexible and deformable intermediate member attached to the head and extending rearwardly therefrom, said member being mounted at its rearward end to said wire;

said head being of sufficient mass so that upon imparting a sharp pull to the forward end of the wire, the trailing end of the wire and the trailing end of the intermediate member will be drawn forwardly toward the head;

said member being collapsible longitudinally, as the trailing end of the member is drawn toward the head;

said member being constructed and arranged to resiliently urge the head forwardly along the wire after said member has been resiliently collapsed;

the rearward end of the intermediate member being mounted to the wire by means comprising:

a sleeve surrounding the rearward portion of the wire, th rearward ends of the intermediate member being attached to the sleeve;

said sleeve being slideably disposed on said wire and being engageable with said means for attaching said fishing hook to the rearward end of the wire to preclude said attaching means from passing forwardly through the sleeve.

5. A fishing lure comprising:

an elongate wire having means for attachment to a fishing line at its forward end and means for attaching a fishing hook to its rearward end;

a relatively heavy, massive head slideably mounted along the wire, said head being, normally disposed at the forward end of the wire;

at least one resilient, flexible and deformable intermediate member attached to the head and extending rearwardly therefrom, said member being mounted at its rearward end to said wire;

said head being of sufficient mass so that upon imparting a sharp pull to the forward end of the wire, the trailing end of the wire and the trailing end of the intermediate member will be drawn forwardly toward the head;

said member being collapsible longitudinally as the trailing end of the member is drawn toward the head;

said member being constructed and arranged to resiliently urge the head forwardly along the wire after said member has been resiliently collapsed;

said at least one resilient, flexible and deformable intermediate member being constructed and arranged to expand laterally of the lure in response to longitudinally collapsing of the member;

said at least one intermediate member comprising:

a plurality of elongate tubes extending generally longitudinally of the wire and being circumferentially and substantially equiangularly spaced about the wire; and said tubes being of a length and cross-sectional normal shape so that they will bend longitudinally in response to said sharp pull on the forward end of the wire, each of the tubes thereby forming a bight portion which will kink in a snapping action to generate an audible sound.

6. A fishing lure as defined in claim 5 further comprising:

said intermediate members being constructed and arranged to generate said audible sound upon return to their relaxed configuration and in response to straightening of the bight portion thereof.

7. A fishing lure comprising:

an elongate wire having means for attachment to a fishing line at its forward end and means for attaching a fishing hook to its rearward end;

a relatively heavy, massive head slideably mounted along the wire, said head being normally disposed at the forward end of the wire;

at least one resilient, flexible and deformable intermediate member attached to the head and extending rearwardly therefrom, said member being mounted at its rearward end to said wire;

said head being of sufficient mass so that upon imparting a sharp pull to the forward end of the wire, the trailing end of the wire and the trailing end of the intermediate member will be drawn forwardly toward the head;

said member being collapsible longitudinally as the trailing end of the member is drawn toward the head;

said member being constructed and arranged to resiliently urge the head forwardly along the wire after said member has been resiliently collapsed;

said head having a center of gravity which is disposed below the wire to tend to maintain the head in a relatively stable attitude as it advances through the water;

a pair of fins extending transversely from the sides of the head, said fins being disposed at a selected angle of incidence to control the depth of the lure in the water as it is advanced through the water.

8. A fishing lure comprising:

an elongate wire having means for attaching a fishing line to its forward end;

a relatively heavy, massive head, slideable mounted on the wire, said head being normally disposed adjacent the forward end of the wire;

a collapsible intermediate lure member attached to the rearward end of the head and extending rearwardly therefrom, the rearward end of the intermediate lure member being connected to the rearward end of the wire in a manner in which advancing forces applied to the wire will be applied to the head at the rear end of the head;

said head being constructed and arranged so that its center of gravity is displaced from the axis of the wire to a location which is normally below said axis to stabilize the attitude of the head as it is drawn through the water;

said head further including a pair of fins extending transversely outwardly from the sides of the head, said fins being oriented at a negative angle of incidence to tend to cause the lure to dive as it is advanced through the water.

9. A fishing lure comprising:

a weighted head;

a trailing portion attached to the head and extending rearwardly therefrom;

means for attaching the head to a fishing line;

said head being constructed to have a center of gravity displaced transversely from the attachment means to bias the head in a relatively stable attitude as it is drawn through the water;

a pair of fins attached to and extending transversely from the sides of the head, said fins being oriented at a predetermined angle of incidence to control the depth of the lure as it is drawn through the water;

said fins being attached to the head at locations displaced from the wire and on the same side of said wire as is the center of gravity of the head.

10. A lure as defined in claim 9 wherein the angle of incidence is substantially neutral to tend to maintain the lure at a relatively constant depth in the water.

11. A lure as defined in claim 9 wherein the angle of incidence of the fins is positive to tend to cause the lure to skim along the surface of the water.

12. A lure as defined in claim 9 wherein the angle of incidence is negative to tend to cause the lure to dive as it is advanced through the water.

* * * * *